United States Patent [19]

Suzuki et al.

[11] Patent Number: 5,070,398
[45] Date of Patent: Dec. 3, 1991

[54] CONTOUR COMPENSATOR FOR CARRIER CHROMINANCE SIGNAL

[75] Inventors: Junji Suzuki; Tsutomu Kawano, both of Itami, Japan

[73] Assignee: Mitsubishi Denki Kabushiki Kaisha, Tokyo, Japan

[21] Appl. No.: 687,092

[22] Filed: Apr. 19, 1991

Related U.S. Application Data

[63] Continuation of Ser. No. 363,774, Jun. 9, 1989, abandoned.

[30] Foreign Application Priority Data

Nov. 15, 1988 [JP] Japan .................. 63-289281

[51] Int. Cl.⁵ .................................. H04N 9/68
[52] U.S. Cl. .................................... 358/37
[58] Field of Search .................... 358/37, 23, 40

[56] References Cited

U.S. PATENT DOCUMENTS

| | | | |
|---|---|---|---|
| 2,830,112 | 4/1958 | Pritchard | 358/23 |
| 3,711,635 | 1/1973 | Worden | 358/28 |
| 3,825,673 | 7/1974 | Schreiner et al. | 358/28 |
| 4,459,613 | 7/1984 | Faroudja | 358/166 |
| 4,918,528 | 4/1990 | Oohashi | 358/162 |

FOREIGN PATENT DOCUMENTS

| | | |
|---|---|---|
| 3136217 | 4/1983 | Fed. Rep. of Germany . |
| 3239308 | 7/1984 | Fed. Rep. of Germany . |
| 3241736 | 7/1984 | Fed. Rep. of Germany . |
| 3829965 | 3/1989 | Fed. Rep. of Germany . |
| 61-589 | 3/1986 | Japan ............... 358/37 |
| 61-590 | 3/1986 | Japan ............... 358/37 |
| 61-274490 | 12/1986 | Japan . |
| 63-292777 | 11/1988 | Japan . |
| 806391 | 12/1958 | United Kingdom ...... 358/31 |
| 1507386 | 4/1978 | United Kingdom ...... 358/31 |

OTHER PUBLICATIONS

A Method for Calculating the Sharpness of TV Pictures, Haruo Isono, Jul. 1983, vol J66-B, No. 7.
Morgenstern, B.: Farbfernsehtechnik, Teubner Studienskripten.

Primary Examiner—John W. Shepperd
Attorney, Agent, or Firm—Oblon, Spivak, McClelland, Maier & Neustadt

[57] ABSTRACT

A contour compensator according to the present invention contour-enhances first and second demodulated signals, which are obtained by temporarily demodulating a carrier chrominance signal by first and second demodulators, instead of directly contour-enhancing the carrier chrominance signal itself since contour enhancement of the carrier chrominance signal itself is difficult. The first and second demodulated signals are low-frequency components and have only amplitude information, and hence contour enhancement thereof is relatively easy.

Thereafter the contour-enhanced first and second demodulated signals are modulated by first and second modulators under the same condition as that in demodulation and composed by an adder, thereby to generate a contour-enhanced carrier chrominance signal. Thus, the newly generated carrier chrominance signal is reliably contour-enhanced, with no hue change or saturation change.

4 Claims, 3 Drawing Sheets

CONTOUR COMPENSATOR FOR CARRIER CHROMINANCE SIGNAL

This application is a continuation of application Ser. No. 07/363,774, filed on 06/09/89, now abandoned.

BACKGROUND OF THE INVENTION

1. Field of the Invention

The present invention relates to a contour compensator for a carrier chrominance signal in a television, a video tape recorder (hereinafter referred to as "VTR") or the like.

2. Description of the Background Art

FIG. 1 is a block diagram showing a conventional method of generating a carrier chrominance signal in a VTR or the like. As shown in FIG. 1, a luminance signal and a chrominance signal recorded in a tape are converted into an electric signal S1 by a head 1, and outputted to a head amplifier 2. The luminance signal is a frequency modulated signal, and the chrominance signal is a low-frequency converted signal.

The electric signal S1 is amplified by the head amplifier 2, and then the frequency modulated luminance signal is removed through a low-pass filter (LPF) 3. Consequently, only a low-frequency chrominance signal $S_C$ is outputted to a main frequency converter 4.

On the other hand, a voltage control oscillator (VCO) 5 forms a PLL circuit (not shown), to output a signal S5 which is synchronous with the chrominance signal $S_C$ to a subfrequency converter 6. A crystal oscillator 7 outputs a subcarrier CS1 to the subfrequency converter 6. The subfrequency converter 6 frequency-converts the signal S5 by using the subcarrier CS1, to output a signal S6 to the main frequency converter 4. The frequency converters 4 and 6 may be multipliers The main frequency converter 4 converts the signal $S_C$ into a high frequency range by using the signal S6, to output a signal S4. This signal S4 passes through a band-pass filter (BPF) 8 and a comb filter 9 to be outputted to the exterior as a carrier chrominance signal CCS, from which unwanted frequency components and crosstalk components are removed.

Although an ideal waveform of the carrier chrominance signal CCS is as shown in FIG. 2A, abrupt portions of the waveform are rounded by losing the high-frequency components as shown in FIG. 2B, since the carrier chrominance signal CCS is obtained through the LPF 3 and the BPF 8.

As hereinabove described, the abrupt portions in the waveform of the carrier chrominance signal CCS obtained by playing back the VTR are so rounded that turning points (contours) of colors are blurred to cause bleeding or the like.

Therefore, it has been necessary to perform contour enhancement by detecting relatively abrupt portions in the waveform of the carrier chrominance signal CCS to enhance abruptness thereof.

However, it has been difficult to perform contour enhancement of the carrier chrominance signal CCS itself, because:

(1) The carrier chrominance signal CCS is in a high-frequency range.

(2) It has amplitude and phase information.

(3) Since it is a chrominance signal, addition of overshooting for aperture control etc. cannot be performed dissimilarly to a luminance signal.

It may be considered to temporarily convert the carrier chrominance signal into a chrominance signal of the baseband for facilitating contour enhancement, without performing addition of overshooting etc. In this case, however, hue change, saturation change and the like are easily caused in re-conversion into the original carrier chrominance signal.

SUMMARY OF THE INVENTION

According to the present invention, a first carrier chrominance signal is temporarily demodulated by first and second demodulators, thereby to obtain first and second demodulated signals.

Then, the first and second demodulated signals are subjected to contour enhancement by first and second contour enhancers. Contour enhancement of the first and second demodulated signals is relatively easy, since the same are low-frequency components and have only amplitude information.

Thereafter the contour-enhanced first and second demodulated signals are modulated by first and second modulators under the same condition as that in demodulation, and composed by an adder, thereby to generate a carrier chrominance signal. Thus, the newly generated carrier chrominance signal is reliably contour-enhanced, and causes no hue change or saturation change.

Accordingly, an object of the present invention is to obtain a contour compensator, which can perform contour enhancement of a carrier chrominance signal without causing hue change and saturation change.

These and other objects, features, aspects and advantages of the present invention will become more apparent from the following detailed description of the present invention when taken in conjuction with the accompanying drawings.

DESCRIPTION OF THE PREFERRED EMBODIMENT

Figure 1:
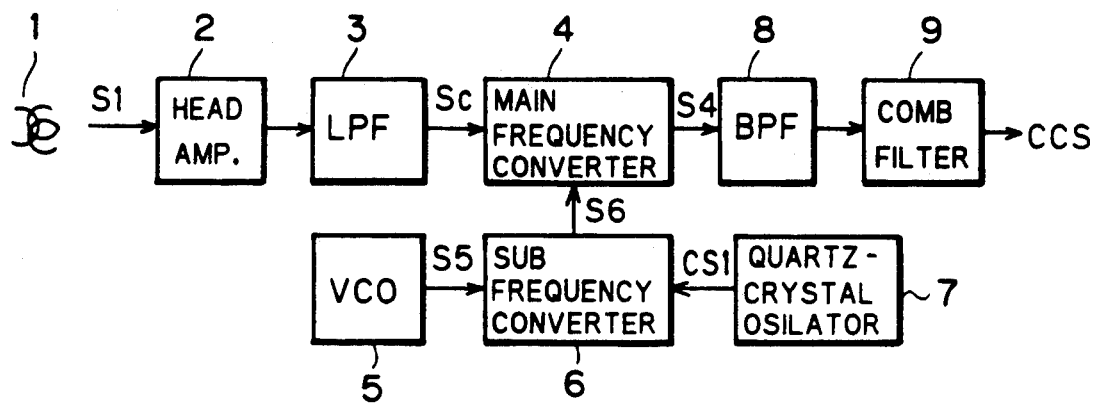
FIG. 1 is a block diagram showing a method of generating a conventional carrier chrominance signal.
Figure 2A:
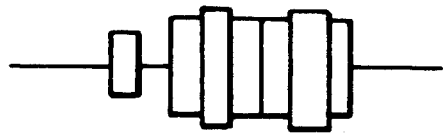
FIGS. 2A and 2B are waveform diagrams showing the conventional carrier chrominance signal.
Figure 2B:
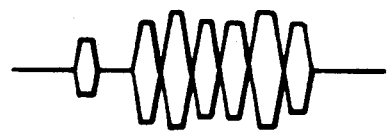
Figure 3:
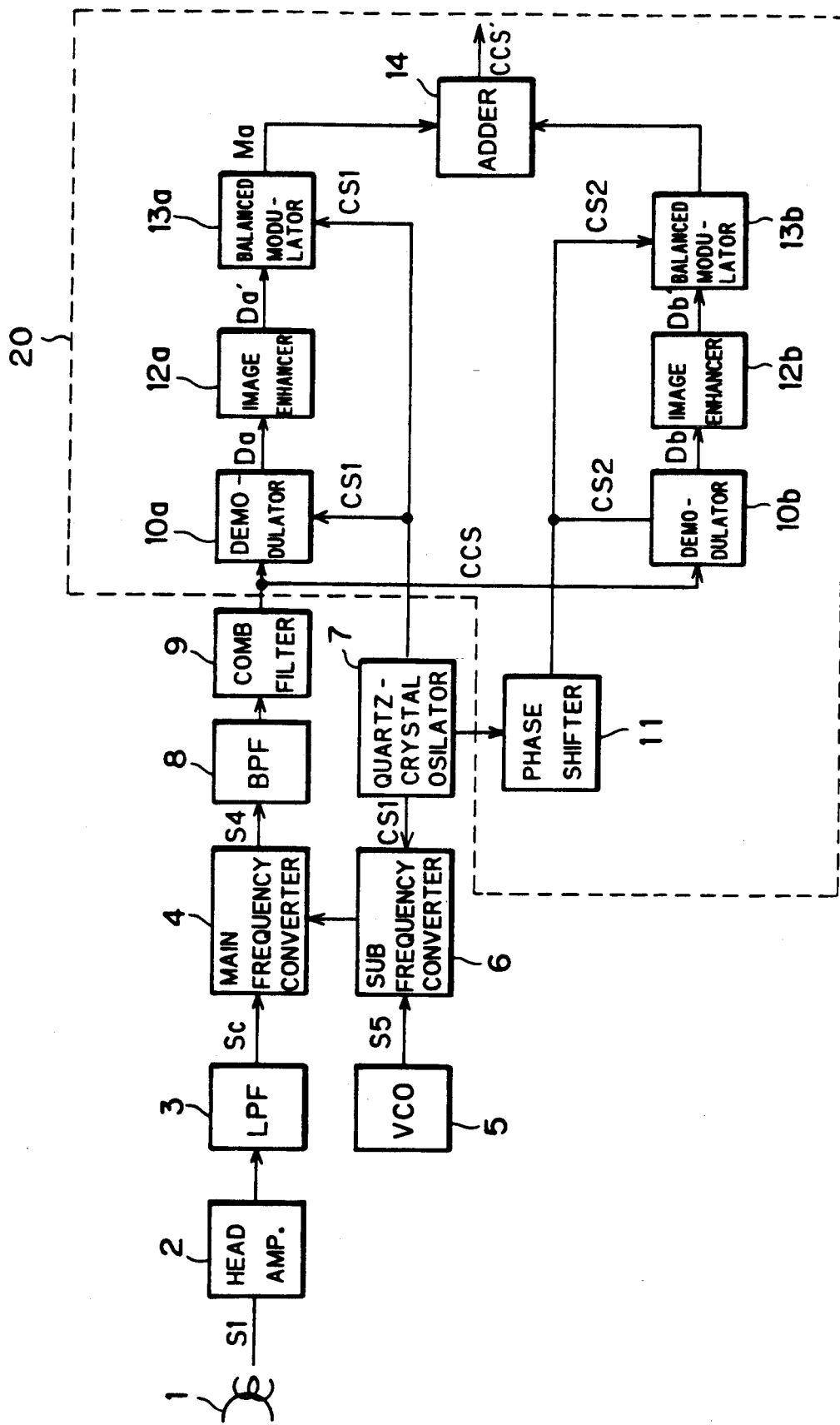
FIG. 3 is a block diagram showing a contour compensator for a carrier chrominance signal according to an embodiment of the present invention.

FIG. 3 is a block diagram showing a contour compensator 20 for a carrier chrominance signal according to an embodiment of the present invention. A carrier chrominance signal CCS generated through structural parts 1 to 9, which are similar to those shown in FIG. 1, is demodulated by two demodulators 10a and 10b into two demodulated signals $D_a$ and $D_b$ shown in FIGS. 4C and 4D, on the basis of subcarriers CS1 and CS2, respectively. The subcarrier CS1 is generated from a quartzcrystal oscillator 7, which is employed for generating the carrier chrominance signal CCS, and the subcarrier CS2 is obtained by shifting the phase of the subcarrier CS1 by an angle $\phi$ ($\neq 180°$) by a phase shifter 11.

Figure 4A:
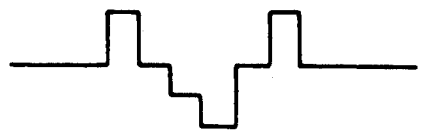
FIGS. 4A to 4D are waveform diagrams showing contour enhancement of demodulated signals in the contour compensator according to the embodiment.
Figure 4B:
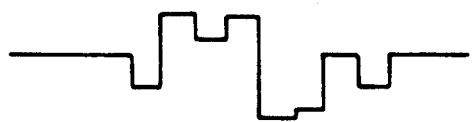
Figure 4C:
Figure 4D:

The demodulated signals $D_a$ and $D_b$ demodulated by the demodulators 10a and 10b are subjected to detection of abrupt waveform portions (contours) by well known contour enhancers 12a and 12b, respectively, to be converted into signals $D_a'$ and $D_b'$, which are enhanced in abruptness, as shown in FIGS. 4A and 4B.

The demodulated signals $D_a$ and $D_b$ are in a low-frequency range and have only amplitude information. Thus, contour enhancement of the demodulated signals $D_a$ and $D_b$ performed with no addition of overshooting or the like is considerably easy as compared with contour enhancement of the carrier chrominance signal CCS.

The signal $D_a'$ and $D_b'$, which are obtained through contour enhancement of the demodulated signals $D_a$ and $D_b$ by the contour enhancers 12a and 12b, are inputted into balanced modulators 13a and 13b, respectively. The balanced modulators 13a and 13b modulate the subcarriers CS1 and CS2 through the signals $D_a'$ and $D_b'$, respectively, to output modulated signals $M_a$ and $M_b$. The modulated signals $M_a$ and $M_b$ are inputted in an adder 14. The adder 14 composes the modulated signals $M_a$ and $M_b$, to output a composite signal as a carrier chrominance signal CCS'.

Thus, the contour compensator 20 for a carrier chrominance signal according to this embodiment temporarily decomposes the carrier chrominance signal CCS into two demodulated signals of a low-frequency range having only amplitude information for facilitating contour enhancement, contour-enhances the two demodulated signals, thereafter modulates the demodulated signals under the same condition as that in demodulation and composes the same to output the carrier chrominance signal CCS', which is in a high-frequency range and having amplitude and phase information similar to the original carrier chrominance signal CCS. Therefore, the composite carrier chrominance signal CCS' is reliably contour-enhanced.

Since the subcarriers CS1 and CS2 employed for demodulation are modulated through the contour-enhanced signals $D_a'$ and $D_b'$ to generate the carrier chrominance signal CCS', no hue change or saturation change is caused in the carrier chrominance signal CCS'.

Although the shift angle $\phi$ by the phase shifter 11 is desirably 90° or 270° in general, the same can be set at any angle other than 0° and 180°. Further, the subcarrier CS1 is not restricted to the output signal of the quartzcrystal oscillator 7.

The contour compensator 20 is not restricted for the carrier chrominance signal in a reproduction system of a VTR, but is also applicable to a carrier chrominance signal in a recording system of a VTR, a color television, a video disk player or the like. If the contour compensator 20 is stored in a one-chip IC, hue change, saturation change and the like can be further suppressed since modulation and demoulation can be performed in higher accuracy.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A contour compensator for a carrier chrominance signal for generating a second carrier chrominance signal by contour-enhancing a first carrier chrominance signal, said contour compensator comprising:
   reference subcarrier generating means for generating a first reference subcarrier and a second reference subcarrier being out of phase with said first reference subcarrier by an angle other than 90° and 180°;
   carrier chrominance signal generating means for generating said first carrier chrominance signal;
   a first demodulator connected to said reference subcarrier generating means and said carrier chrominance signal generating means for demodulating said first carrier chrominance signal through said first reference subcarrier to output a first demodulated signal;
   a second demodulator connected to said reference subcarrier generating means and said carrier chrominance signal generating means for demodulating said first carrier chrominance signal through said second reference subcarrier to output a second demodulated signal;
   a first contour enhancer connected to said first demodulator for detecting abrupt waveform portions of said first demodulated signal and enhancing abruptness thereof, thereby to output a first contour-enhanced signal;
   a second contour enhancer connected to said second demodulator for detecting abrupt waveform portions of said second demodulated signal and enhancing abruptness thereof, thereby to output a second contour-enhanced signal;
   a first modulator connected to said reference subcarrier generating means and said first contour enhancer for modulating said first reference subcarrier through said first contour-enhanced signal to output a first modulated signal;
   a second modulator connected to said reference subcarrier generating means and said second contour enhancer for modulating said second reference subcarrier through said second contour-enhanced signal to output a second modulated signal; and
   an adder connected to said first and second modulators for composing said first and second modulated signals to generate said second carrier chrominance signal.

2. A contour compensator for a carrier chrominance signal in accordance with claim 1, wherein
   said reference subcarrier generating means comprises:
   a crystal oscillator for generating said first reference subcarrier, and
   a phase shifter for shifting a phase of said first reference subcarrier by an angle other than 90° and 180°, to output said second reference subcarrier.

3. A contour compensator for a carrier chrominance signal in accordance with claim 2, wherein
   said crystal oscillator is shared with said carrier chrominance signal generating means.

4. A contour compensator for a carrier chrominance signal in accordance with claim 1, wherein
   said carrier chrominance signal generating means includes a reproduction system of a VTR.

* * * * *